United States Patent
Nakamura et al.

(10) Patent No.: US 9,630,476 B2
(45) Date of Patent: Apr. 25, 2017

(54) VIEW ADJUSTMENT DEVICE OF VEHICLE

(71) Applicant: MAZDA MOTOR CORPORATION, Hiroshima (JP)

(72) Inventors: Kazuki Nakamura, Hiroshima (JP); Masaki Chiba, Hiroshima (JP); Kumiko Maebashi, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 32 days.

(21) Appl. No.: 14/832,343

(22) Filed: Aug. 21, 2015

(65) Prior Publication Data

US 2016/0089961 A1    Mar. 31, 2016

(30) Foreign Application Priority Data

Sep. 29, 2014 (JP) ................. 2014-198541

(51) Int. Cl.
| | |
|---|---|
| *B60J 1/00* | (2006.01) |
| *B60J 1/02* | (2006.01) |
| *G02F 1/137* | (2006.01) |
| *B60R 1/00* | (2006.01) |
| *B60J 3/04* | (2006.01) |
| *G02F 1/133* | (2006.01) |

(52) U.S. Cl.
CPC ............ *B60J 3/04* (2013.01); *G02F 1/13306* (2013.01)

(58) Field of Classification Search
CPC ..... B60J 1/002; B60J 1/02; B60R 1/01; G02F 1/137
See application file for complete search history.

(56) References Cited

U.S. PATENT DOCUMENTS

| | | | |
|---|---|---|---|
| 7,264,386 B2* | 9/2007 | Ito .................. | B60Q 1/14 362/461 |
| 7,382,274 B1* | 6/2008 | Kermani ............ | B60K 31/0058 340/435 |
| 7,496,446 B2* | 2/2009 | Maruyama ....... | G08G 1/096783 340/995.1 |

(Continued)

FOREIGN PATENT DOCUMENTS

| | | | |
|---|---|---|---|
| JP | 2005-075188 A | | 3/2005 |
| JP | 2007302116 A | * | 11/2007 |

(Continued)

*Primary Examiner* — Tuan C. To
(74) *Attorney, Agent, or Firm* — Studebaker & Brackett PC (57) ABSTRACT

A view adjustment device of a vehicle which adjusts a view recognized by a driver through a windshield glass comprises a visual-stimulation indicating mechanism capable of indicating shielding portions in a view area of the diver and a controller to control an indication manner of the visual-stimulation indicator. The controller comprises a traveling-direction determination portion to determine a traveling direction of the vehicle, a traveling-speed determination portion to determine a traveling speed of the vehicle, and an indication control portion to control the visual-stimulation indicating mechanism. The indication control portion is configured such that when it is determined that the vehicle travels in a straight direction, the high-speed shielding portion is indicated at a position located relatively on a leftward side, in a vehicle width direction, compared to the low-speed shielding portion or the middle-speed shielding portion.

6 Claims, 11 Drawing Sheets

(56) References Cited

U.S. PATENT DOCUMENTS

| | | | | |
|---|---|---|---|---|
| 8,007,022 B2* | 8/2011 | Fujimoto | | B60J 1/02 296/84.1 |
| 8,970,451 B2* | 3/2015 | Nagasawa | | B60K 35/00 345/7 |
| 2003/0122930 A1* | 7/2003 | Schofield | | B60R 1/00 348/148 |
| 2004/0239141 A1* | 12/2004 | Iwao | | B60J 1/20 296/84.1 |
| 2005/0046222 A1* | 3/2005 | Ito | | B60J 3/04 296/96.19 |
| 2006/0275042 A1* | 12/2006 | Iwao | | B60J 1/20 398/182 |
| 2007/0102950 A1* | 5/2007 | Uematsu | | B60J 1/02 296/96.19 |
| 2010/0094501 A1* | 4/2010 | Kwok | | G02B 27/01 701/36 |
| 2010/0097240 A1* | 4/2010 | Soulchin | | G01C 21/3691 340/905 |
| 2010/0156617 A1* | 6/2010 | Nakada | | A61B 3/113 340/439 |
| 2010/0165099 A1* | 7/2010 | Marchthaler | | B60J 3/04 348/135 |
| 2011/0303828 A1* | 12/2011 | Mikat | | B60J 3/04 250/214 R |
| 2012/0206050 A1* | 8/2012 | Spero | | B60Q 1/04 315/152 |
| 2014/0015977 A1* | 1/2014 | Taylor | | B60C 23/0408 348/148 |
| 2014/0092250 A1* | 4/2014 | Nagasawa | | G01C 21/3602 348/148 |

FOREIGN PATENT DOCUMENTS

| | | | |
|---|---|---|---|
| JP | 2008-222204 A | 9/2008 | |
| JP | 2014100961 A * | 6/2014 | B60S 1/463 |

* cited by examiner

VIEW ADJUSTMENT DEVICE OF VEHICLE

BACKGROUND OF THE INVENTION

The present invention relates to a view adjustment device of a vehicle which adjusts a view recognized by a driver by indicating visual stimulation.

Conventionally, a windshield glass for a vehicle which assists a drive sense (driving feeling) of a driver by providing specified marks at right-and-left both ends of the windshield glass and guiding driver's eyes (gazing point) so that the driver's eyes can be focused on a position located below an imaginary straight line which connects the right and left marks is known (Japanese Patent Laid-Open Publication No. 2008-222204). According to the windshield glass for the vehicle, since it is prevented that the driver's eyes are diffusely directed to a position located above the imaginary straight line, the driver can pay stable attention onto a road.

A technology that a forward view of the driver is so adjusted by shielding a lower end portion of the windshield glass that the driving safety can be improved is known as well. In a view adjusting device of a vehicle disclosed in Japanese Patent Laid-Open Publication No. 2005-75188, there is provided a triangular area at the windshield glass, which has an apex and two sides (right-and-left ridgelines), wherein the apex is located between a driver's facing point and a vehicle's central point which is offset from the driver's facing point, and the two sides (right-and-left ridgelines) extend, slanting uniformly, from the apex toward both ends, in the vehicle width direction, of the base. Herein, the triangular area has a lower visible light transmittance than an outside area of this triangular area (that is, the triangular area has a translucent or non-transparent state of the windshield glass in which driver's forward visibility through the windshield glass is limited), so that parting lines which correspond to the above-described two sides of the triangular area (right-and-left ridgelines) are created by a difference in contrast. Thereby, in addition to the shielding effect of the lower end portion of the windshield glass, fluctuations of a head's inclination angle during vehicle cornering can be suppressed, so that a driving position of the driver is stabilized and thereby disturbance of steering can be suppressed.

Figure 8:
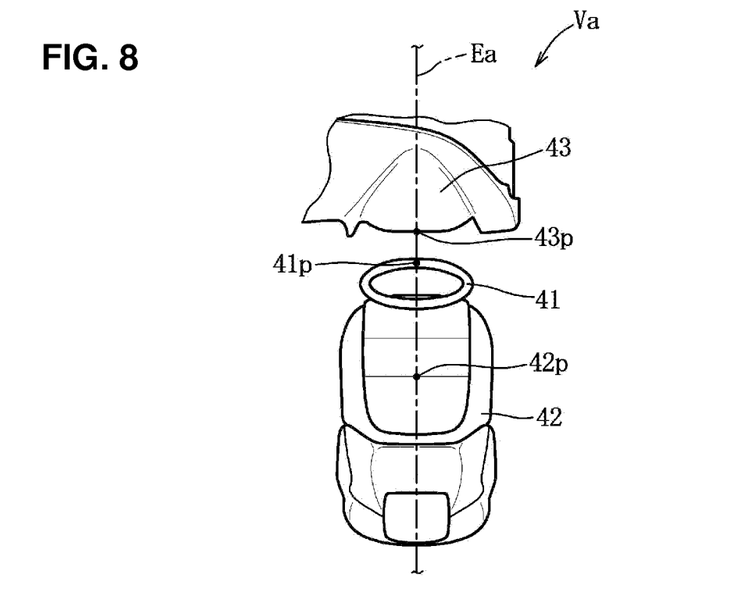
FIG. 8 is a plan view of an inside of a vehicle compartment of a vehicle for verification experiment.
Figure 9:
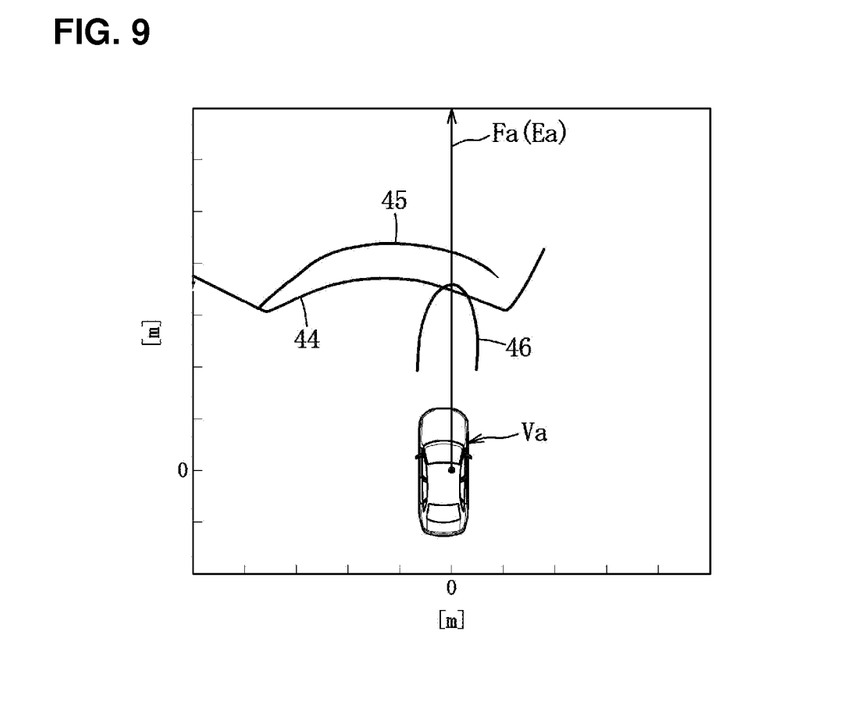
FIG. 9 is a diagram showing contours of projection images of a windshield glass, a bonnet, and a meter hood which are projected on a road surface around a driver's head.

The inventors of the present invention recognized a phenomenon that drivers unconsciously direct their eyes toward an outward side in the vehicle width direction when a vehicle travels straightly, in particular, at the time of a high speed traveling. There is a concern that this phenomenon may cause the driver to have an illusion that the vehicle does not have a good straight-traveling stability even if the vehicle is traveling straight properly stably. Herein, the inventors conducted a verification experiment to verify causing factors of this phenomenon. A precondition of the verification experiment will be described first. As shown in FIGS. 8 and 9, a vehicle Va is configured such that a steering wheel 41 is arranged on the right and a direction of an extension line Ea which connects a center 42p of a driver's seat 42, a top 43p of a meter hood 43, and a top 41p of the steering wheel 41 matches a direction of a vehicle-body center line Fa extending in a vehicle longitudinal direction which is a physical front direction of a vehicle body. In FIG. 9, reference characters 44, 45 and 46 denote respective contours of projection images of a windshield glass, a bonnet (engine hood), and a meter hood which are respectively projected on a road surface around a diver's head. Herein, a direction of driver's eyes, that is—a head's rotational angle of the driver, when the vehicle travels straightly at different speeds was measured.

Figure 10:
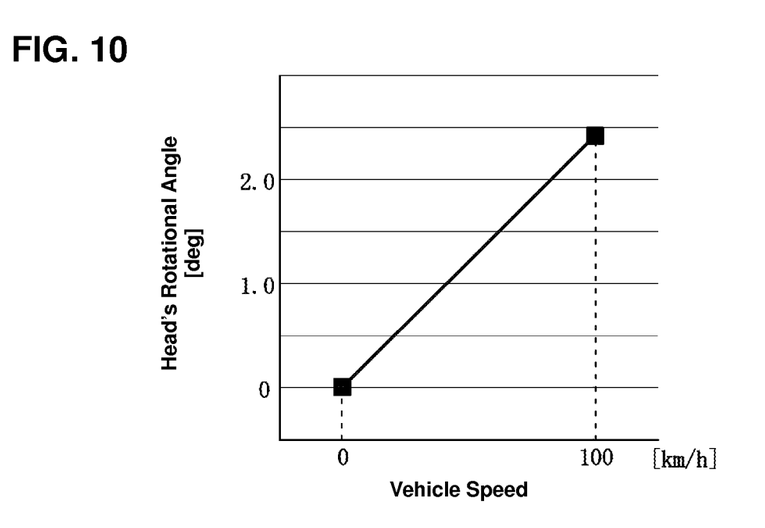
FIG. 10 is a graph showing verification results.

Results of the verification are shown in FIG. 10. As shown in FIG. 10, when the vehicle Va stops, the head's rotational angle is 0 (degree), and the direction of the driver's eyes is the same as the direction of the vehicle-body center line Fa (the direction of the extension line Ea). The driver's head tends to rotate in a right direction when the vehicle traveling speed becomes higher, and the head's rotational angle relative to the vehicle-body center line Fa was 2.4 (degrees) when the vehicle traveling speed was 100 (km/h).

The driver generally perceives and recognizes objects through visual information processing of visual information (optical flow) of the objects obtained through the windshield glass by using the visual function of the driver's both eyes. The eyes' visual function is classified into the function of recognizing different objects with the both eyes concurrently, the function of recognizing objects three-dimensionally (three-dimensional viewing), and the function of recognizing a single object by combining each visual image on the retina of each eye and forming a single image (fusion).

Figure 11A:
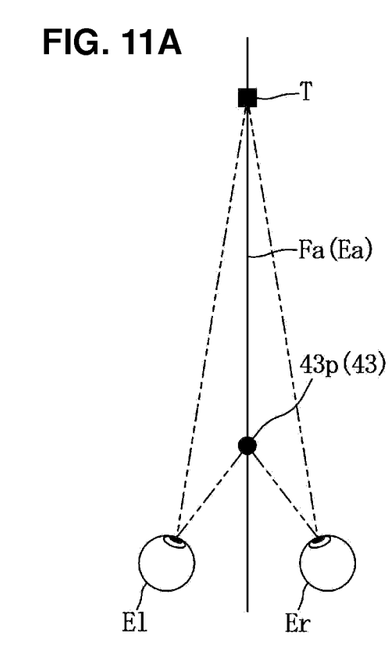
FIGS. 11A, 11B and 11C are model diagrams to explain a visual function of both eyes of a driver, FIG. 11A being the one showing a state in which a front pillar is omitted, FIG. 11B being the one showing a state in which the front pillar exists, and FIG. 11C being the one showing a state in which a top of the meter hood is shifted.

As shown in FIG. 11A, in a case in which the direction of the vehicle-body center line Fa matches the direction of the extension line Ea, the driver theoretically operates the steering wheel 41 so that a target T of the vehicle traveling direction can be positioned on the extension line Ea at the time of the vehicle straight traveling. Therefore, the driver drives the vehicle such that the top 43p of the meter hood 43 and the target T which are positioned on the extension line Ea as marks of vehicle driving overlap each other in front.

Figure 11B:
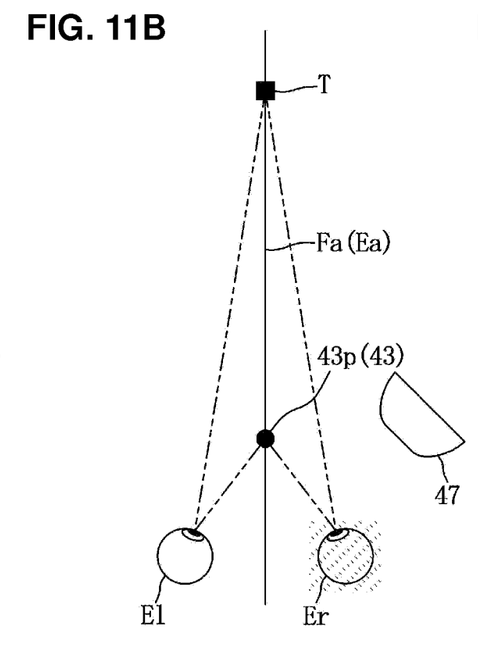

As shown in FIG. 11B, in a case in which the steering wheel 41 of the vehicle Va is arranged on the right, a right-side front pillar 47 is provided near a right-side eye Er, so that the right-side eye Er gets a pressure feeling (stress). Further, the visual information which the right-side eye Er can visually recognize through the windshield glass is blocked by the right-side front pillar 47 suddenly, so that this information becomes less than the visual information which a left-side eye El can visually recognize through the windshield glass. Therefore, the left-side eye El which gets less pressing feeling and obtains more visual information becomes a dominant eye tentatively and thereby the predominance of the right-side eye Er decreases relatively. Consequently, since the rate of the fusion of the left-side eye Er becomes higher than that of the right-side eye Er (i.e., becomes predominant), it is assumed that the driver may visually recognize views such that the top 43p of the meter hood 43 is positioned on the right side of the target T by an optical illusion based on the visual information processing. It can be considered that a head's rotation tendency which is caused by the optical illusion based on the visual information processing increases more as the amount of visual information obtained through the windshield glass becomes larger, i.e., the vehicle traveling speed becomes higher.

Figure 11C:
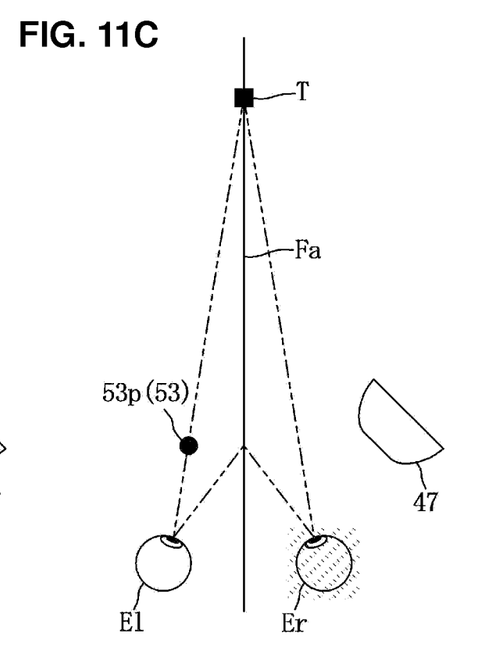

As shown in FIG. 11C, when the rate of the fusion of the left-side eye El is higher than that of the right-side eye Er, it can be considered that the diver can be theoretically made to visually recognize views such that the top 53b of the meter hood 53 and the target T overlap each other in front by slightly shifting the top 53p of the meter hood 53 to the left (toward the inward side in the vehicle width direction), thereby suppressing the head's rotation of the driver.

Figure 12:
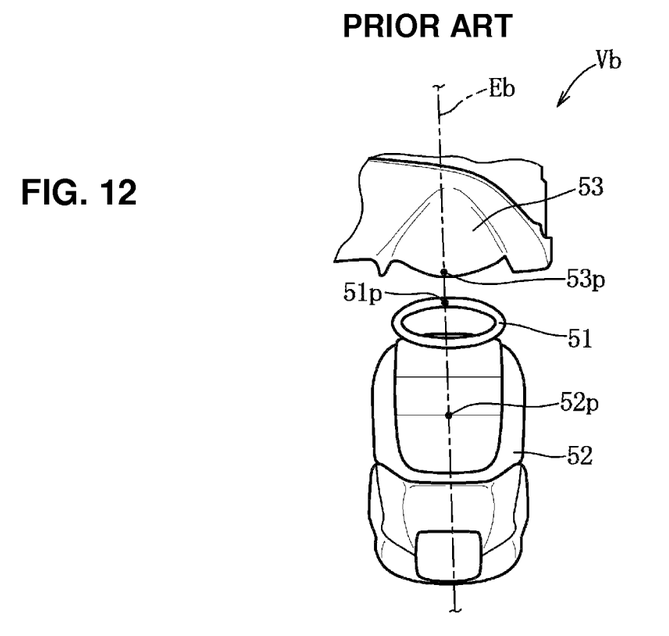
FIG. 12 is a plan view of an inside of a vehicle compartment of a conventional vehicle.
Figure 13:
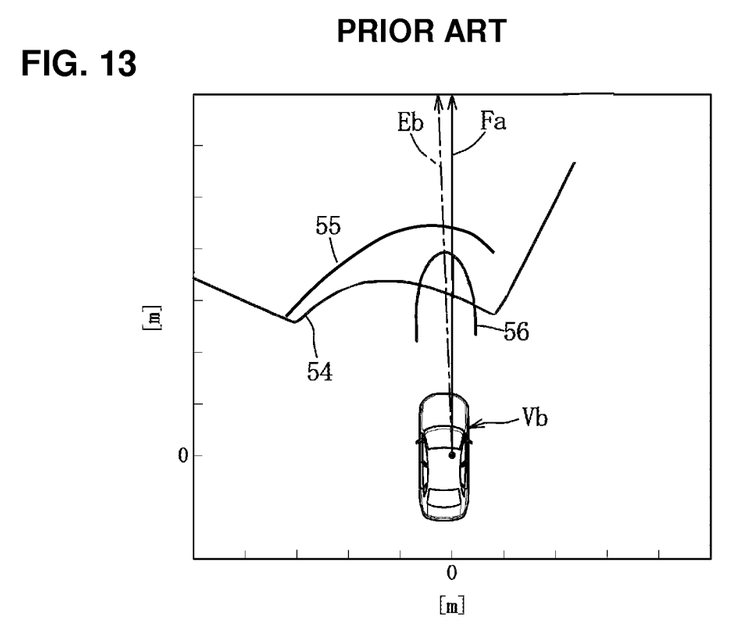
FIG. 13 is a diagram showing contours of projection images of the windshield glass, the bonnet, and the meter hood which are projected on the road surface around the driver's head.

Accordingly, as shown in FIGS. 12 and 13, the driver can be made to visually recognize views such that the top 53c of the meter hood 53 and the target T overlap each other in front by shifting the top 53p of the meter hood 53 of the vehicle Vb to the left even when the vehicle traveling speed is high, so that the stability of the vehicle straight traveling by the driver at the time of the high vehicle-speed traveling can be ensured. In FIGS. 12 and 13, reference characters 51, 52, Eb, Fa, 54, 55 and 56 denote the steering wheel, the driver's seat, the extension line connecting tops 51p, 52p, 53p, the vehicle-body center line, the contour of the projection image of the windshield glass, the contour of the projection image of the bonnet, and the contour of the projection image of the meter hood, respectively.

However, while the stability of the vehicle straight traveling at the time of the high vehicle-speed traveling can be ensured in a case in which the position of the top 53p of the meter hood 53 is slightly shifted to the left, the direction of the vehicle-body center line Fa does not match the direction of the extension line Eb, i.e., these two lines do not cross each other, at the time of vehicle stop, in other words. Therefore, there is a concern that the driver may have a sense of discomfort.

SUMMARY OF THE INVENTION

An object of the present invention is to provide a view adjustment device of a vehicle which can ensure the stability of the vehicle straight traveling at the time of the high vehicle-speed traveling, preventing the driver from having a sense of discomfort.

The present invention is a view adjustment device of a vehicle which adjusts a view recognized by a driver through a windshield glass, comprising a visual-stimulation indicator capable of indicating visual stimulation in a view area of the diver, and a controller to control an indication manner of the visual-stimulation indicator, wherein the controller comprises a traveling-direction determination portion to determine a traveling direction of the vehicle, a traveling-speed determination portion to determine a traveling speed of the vehicle, and an indication control portion to control the visual-stimulation indicator based on determination results of the traveling-direction determination portion and the traveling-speed determination portion, and the indication control portion is configured such that when the traveling-direction determination portion determines that the vehicle travels in a straight direction, the visual stimulation indicated by the visual-stimulation indicator in a case in which the vehicle's traveling speed is relatively high is indicated at a position which is located relatively on an inward side, in a vehicle width direction, compared to the visual stimulation indicated by the visual-stimulation indicator in a case in which the vehicle's traveling speed is relatively low.

According to the present invention, since the visual stimulation indicated at the time of the high vehicle-speed traveling is indicated at the position which is located relatively on the inward side, in the vehicle width direction, compared to the visual stimulation indicated at the time of the low vehicle-speed traveling, consciousness of the driver can be turned toward the inward side in the vehicle width direction. Thereby, by reducing the pressure feeling caused by the front pillar and recovering the predominance of the outward-side eye, a decrease of the rate of the fusion of the outward-side eye can be suppressed at the time of the high vehicle-speed traveling, so that a gap between a physical front direction of a vehicle body and a vehicle-body front direction which the driver recognizes can be suppressed.

In an embodiment of the present invention, the visual-stimulation indicator is configured to indicate the visual stimulation at an upper-end portion or a lower-end portion of the windshield glass. According to this embodiment, the consciousness of the driver can be turned toward the inward side in the vehicle width direction, ensuring the view of the driver.

In another embodiment of the present invention, the visual stimulation indicted by the visual-stimulation indicator is a shielding portion which has a translucent or non-transparent state of the windshield glass in which driver's forward visibility through the windshield glass is limited, the shielding portion being configured substantially in a triangular shape such that a base thereof is positioned at an upper end or a lower end and an apex thereof is directed toward a central side of the windshield glass. According to this embodiment, the consciousness of the driver can be turned toward the inward side in the vehicle width direction, ensuring the view of the driver, with a simple structure.

In another embodiment of the present invention, the visual-stimulation indicator is configured such that the visual stimulation indicated thereby becomes larger as the vehicle's traveling speed becomes higher. According to this embodiment, the decrease of the fusion of the outward-side eye can be suppressed even in a case in which the amount of visual information obtained through the windshield glass is large.

In another embodiment of the present invention, the visual-stimulation indicator is configured such that the visual stimulation indicated thereby is movable from a point which corresponds to a physical front direction of a vehicle body toward the inward side, in the vehicle width direction, of the windshield glass. According to this embodiment, the decrease of the rate of the fusion of the outward-side eye can be suppressed with a simple structure.

In another embodiment of the present invention, the physical front direction of the vehicle body is a direction of an extension line which connects a center, in the vehicle width direction, of a driver's seat and a top of a meter hood provided at an instrument panel. According to this embodiment, the driver can be prevented from having a sense of discomfort at the time of vehicle stop.

Other features, aspects, and advantages of the present invention will become apparent from the following description which refers to the accompanying drawings.

DETAILED DESCRIPTION OF THE INVENTION

Hereafter, embodiments of the present invention will be described referring to the drawings. The following description just exemplifies the present invention applied to a vehicle, which does not limit any application or use of the present invention.

Embodiment 1

Figure 1:
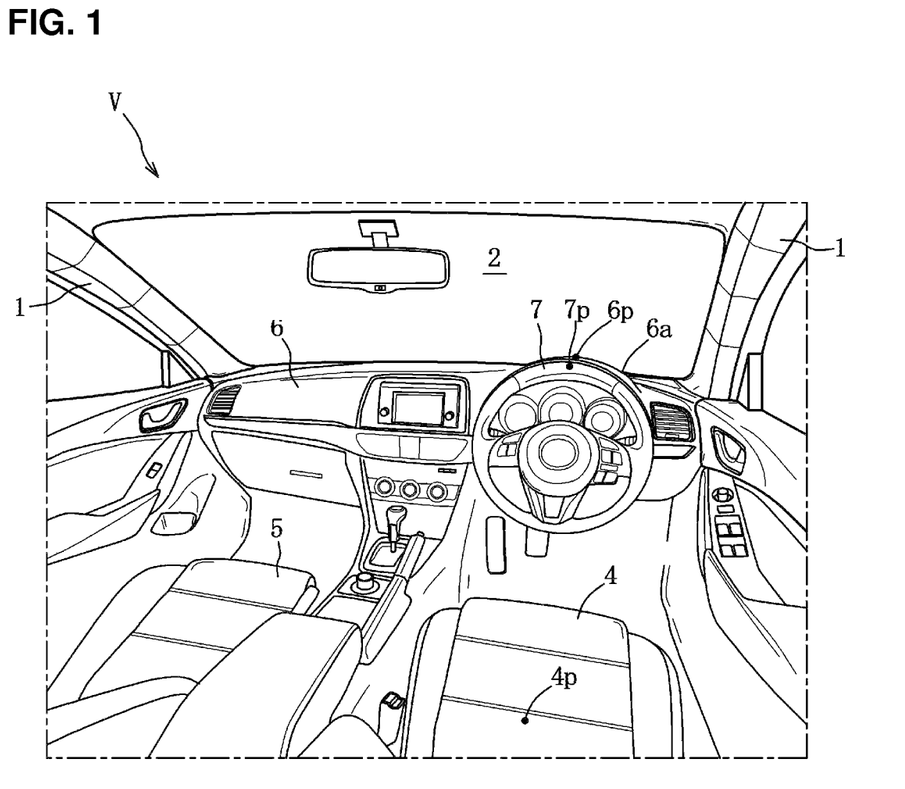
FIG. 1 is a view of a vehicle-body front of a vehicle according to a first embodiment, when viewed from an inside of a vehicle compartment.
Figure 2:
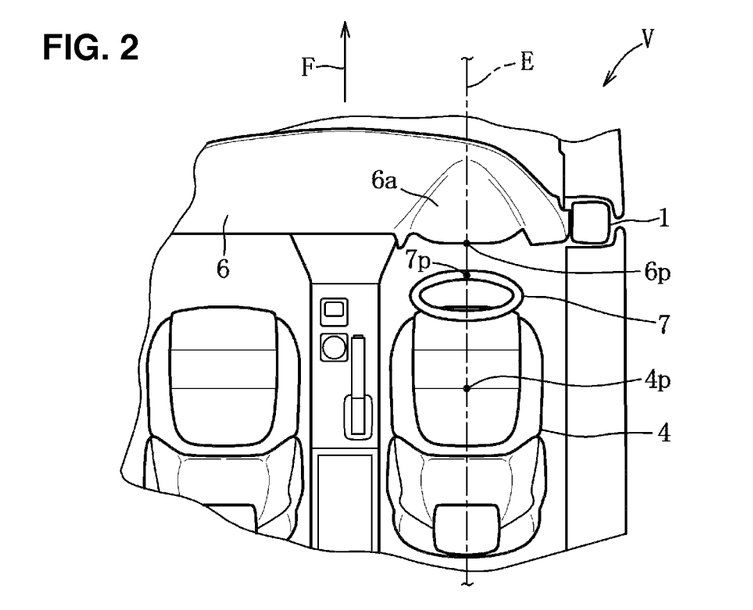
FIG. 2 is a plan view of the inside of the vehicle compartment.
Figure 3:
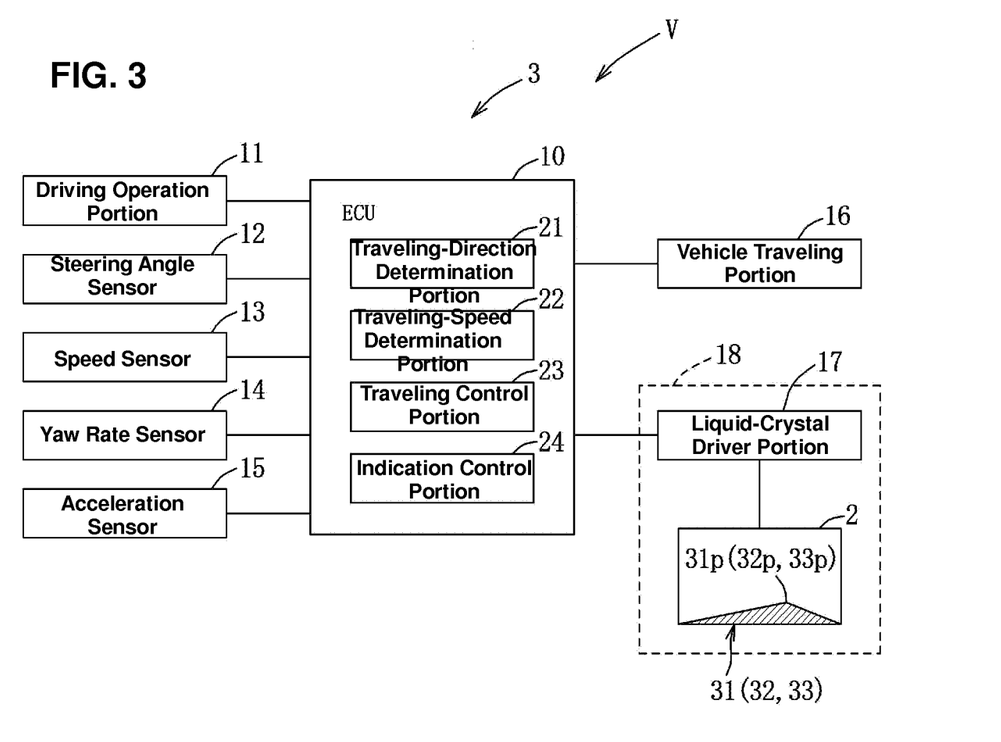
FIG. 3 is a block diagram of a view adjustment device.

A first embodiment of the present invention will be described referring to FIGS. 1-5. As shown in FIGS. 1-3, a vehicle V of the present embodiment comprises a roof panel (not illustrated), a pair of right-and-left roof side rails extending in a longitudinal direction (not illustrated), a pair of right-and-left front pillars 1 extending in a vertical direction, a windshield glass 2 arranged between the pair of right-and-left front pillars 1, a view adjustment device 3 which adjusts a view recognized by a driver through the windshield glass 2, and others.

A lower-end portion of the windshield glass 2 is made of dimming glass capable of selectively changing the transmittance in a specified area thereof. This lower-end portion of the windshield glass 2 is configured such that the transmittance is changeable by electrically changing optical characteristics of a liquid-crystal layer which is interposed between two transparent substrates, for example. The liquid-crystal layer is controlled by an ECU (Electric Control Unit) 10 of the view adjustment device 3. Herein, an EL (Electroluminescence) layer may be used in place of the liquid-crystal layer.

At a front side of a vehicle compartment are provided a right-side driver's seat 4 and a passenger seat (driver's assistant seat) 5 which arranged beside a console box interposed between the both seats 4, 5. A rear seat (not illustrated) is installed behind these seats. An instrument panel 6 extending in a vehicle width direction is arranged in front of the driver's seat 4 and the passenger seat 5. Plural meters and the like are provided at a right-side portion of the instrument panel 6, and above the meters and the like is arranged a meter hood 6a which protrudes upward and rearward and is of a partially arc shape in a vertically-sectional view. A steering wheel 7 is arranged between the meter hood 6a and the driver's seat 4. Hereinafter, a longitudinal direction of the vehicle body will be referred to as a longitudinal direction and a lateral direction of the vehicle body will be referred to as a lateral direction, simply.

As shown in FIG. 2, the driver's seat 4, the meter hood 6a, and the steering wheel 7 are provided such that a center 4p, in the vehicle width direction, of the driver's seat 4, a top 6p of the meter hood 6a, and a top 7p of the steering wheel 7 are positioned on an extension line E. This extension line E extends toward the same direction as a vehicle-body center line F which extends in a physical front direction of the vehicle V. Since the driver's seat 4 is arranged along the extension line E, the driver's eyes are directed to the physical front direction of the vehicle V when the driver 4 is seated in the driver's seat 4.

The view adjustment device 3 is configured such that the decrease of the rate of the fusion of the right-side eye can be suppressed, thereby ensuring the stability of the vehicle straight traveling at the time of the high traveling-speed traveling of the vehicle V, by reducing the pressure feeling caused by the front pillar 1 and increasing the predominance of the right-side eye. The view adjustment device 3 comprises the ECU 10. This ECU 10 is an electric control unit which comprises CPU, ROM, RAM and others, where application programs stored at the ROM are loaded at the RAM and then run (executed) by the CPU, thereby performing various kinds of arithmetic (data) processing.

As shown in FIG. 3, the ECU 10 is electrically connected to a driving operation portion 11, a steering angle sensor 12, a speed sensor 13, a yaw rate sensor 14, an acceleration sensor 15, a vehicle traveling portion 16, a liquid-crystal driver portion 17, and others. The driving operation portion 11 comprises operational equipment, such as an acceleration pedal (not illustrated) and a brake pedal. This driving operation portion 11 outputs operational amounts (variables) inputted by the driver to the ECU 10. The steering angle sensor 12 is a sensor to detect the steering angle of the steering wheel 7 operated by the driver, and the speed sensor 13 is a sensor to detect an actual traveling speed of the vehicle V. The yaw rate sensor 14 is a sensor to detect a yaw rate of the vehicle V, and the acceleration sensor 15 is a sensor to detect an acceleration of the vehicle V. These sensors 12-15 output respective detection results to the ECU 10.

The vehicle traveling portion 16 is a drive mechanism or a steering mechanism to perform a traveling control of the vehicle V. This vehicle traveling portion 16 includes an engine control portion, a steering actuator, a brake actuator, a shift actuator, and others (not illustrated). The vehicle traveling portion 16 performs the traveling control of the vehicle V according to output signals of the ECU 10.

The liquid-crystal driver portion 17 is configured to supply a necessary voltage to the liquid-crystal layer provided at a specified area of the lower-end portion of the windshield glass 2 so that the transmittance of the specified area of the lower-end portion of the windshield glass 2 can be changed between 100% and 0%. The liquid-crystal driver portion 17 is configured to indicate shielding portions 31-33 (visual stimulation) at the lower-end portion of the windshield glass 2 according to a traveling state of the vehicle V. Herein, the shielding portions 31-33 are configured in a triangular shape such that they have apexes 31p-33p and each base of those is positioned at the lower end of the windshield glass 2. This liquid-crystal driver portion 17 and the windshield glass 2 including the liquid-crystal layer correspond to a visual-stimulation indicating mechanism 18 (visual-stimulation indicator).

As shown in FIG. 3, the ECU 10 comprises a traveling-direction determination portion 21, a traveling-speed determination portion 22, a traveling control portion 23, an indication control portion 24, and so on. The traveling-direction determination portion 21 determines a traveling direction of the vehicle V based on the output of the steering angle sensor 12. The traveling-speed determination portion 22 determines a low traveling speed, a middle traveling speed, or a high traveling speed of the vehicle V based on the output of the speed sensor 13.

The traveling control portion 23 sets a target output of an engine based on the amount of depression of the acceleration pedal operated by the driver, and sets a target operational amount (variable) of a shift actuator based on the depression amount of the acceleration pedal and the traveling speed of the vehicle V. Further, this traveling control portion 23 sets a target operational amount (variable) of a steering actuator based on the output of the steering angle sensor 12, and sets a target operational amount (variable) of a brake actuator based on the depression amount of the brake pedal.

Figure 5A:
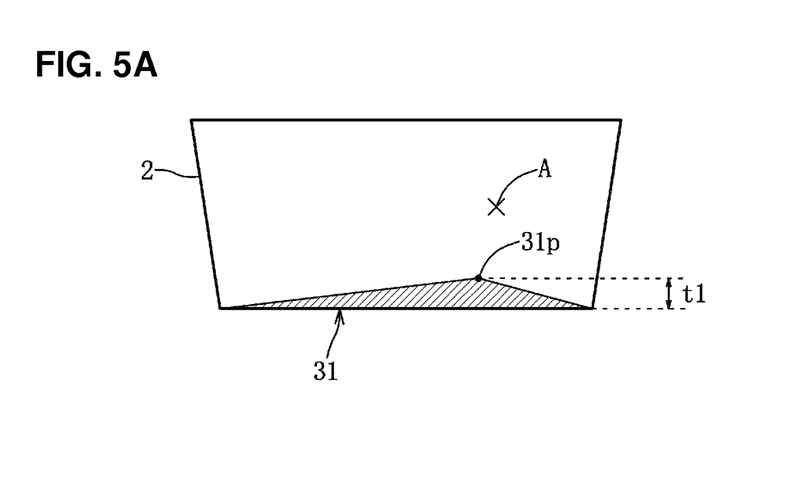
FIGS. 5A, 5B and 5C are indication examples of visual stimulation, FIG. 5A being the one at the time of low vehicle-speed traveling, FIG. 5B being the one at the time of middle vehicle-speed traveling, and FIG. 5C being the one at the time of high vehicle-speed traveling.

The indication control portion 24 controls the visual-stimulation indicating mechanism 18 such that it is determined that the vehicle V travels in the straight direction, the shielding portion indicated at the time of the high traveling-speed traveling is indicated at a position which is located relatively on a left side, compared to the shielding portion indicated at the time of the low traveling-speed traveling. As shown in FIG. 5A, the low-speed shielding portion 31 is indicated by the indication control portion 24's control of setting the transmittance of the specified area at 0% at the time of the low traveling-speed and straight traveling. The apex 31p of the low-speed shielding portion 31 is set at the same position, in the vehicle width direction, as a physical front position A which corresponds to the direction of the extension line E, and set at a level which is t1 spaced apart from the lower end of the windshield glass 2.

Figure 5B:
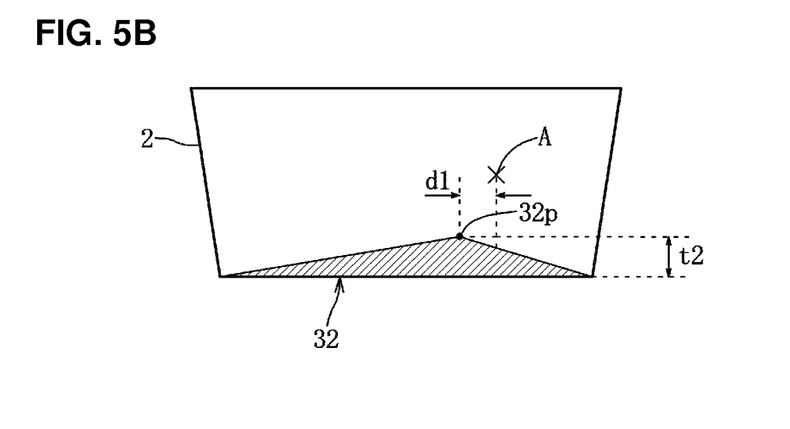
Figure 5C:
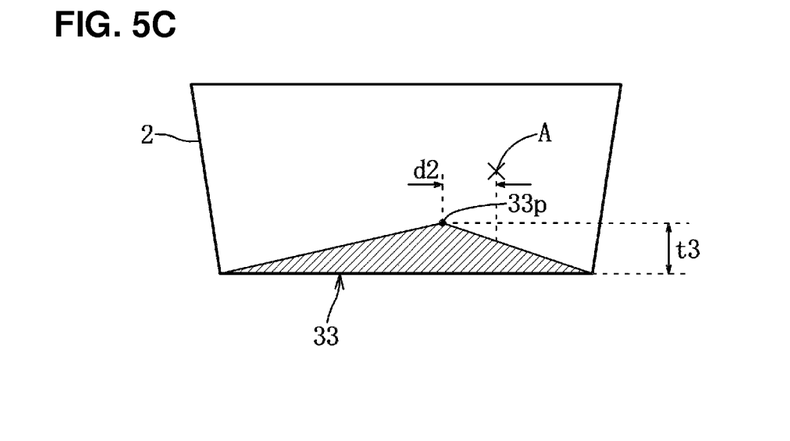

As shown in FIG. 5B, the middle-speed shielding portion 32 is indicated by the indication control portion 24's control of setting the transmittance of the specified area at 0% at the time of the middle traveling-speed and straight traveling. The apex 32p of the middle-speed shielding portion 32 is set at a position which is d1 spaced leftward from the physical front position A, and set at a level which is t2 (t1<t2) spaced apart from the lower end of the windshield glass 2. Thus, the middle-speed shielding portion 32 has a larger area than the low-speed shielding portion 31 and also the apex 32p is located so as to be recognized by the driver more easily than the apex 31p. Thereby, the middle-speed shielding portion 32 is configured to have the more (greater) visual stimulation than the low-speed shielding portion 31. As shown in FIG. 5C, the high-speed shielding portion 33 is indicated by the indication control portion 24's control of setting the transmittance of the specified area at 0% at the time of the high traveling-speed and straight traveling. The apex 33p of the high-speed shielding portion 33 is set at a position which is d2 (d1<d2) spaced leftward from the physical front position A, and set at a level which is t3 (t2<t3) spaced apart from the lower end of the windshield glass 2. Thus, the high-speed shielding portion 33 has a larger area than the middle-speed shielding portion 32 and also the apex 33p is located so as to be recognized by the driver more easily than the apex 32p. Thereby, the high-speed shielding portion 33 is configured to have the more (greater) visual stimulation than the middle-speed shielding portion 32.

Figure 4:
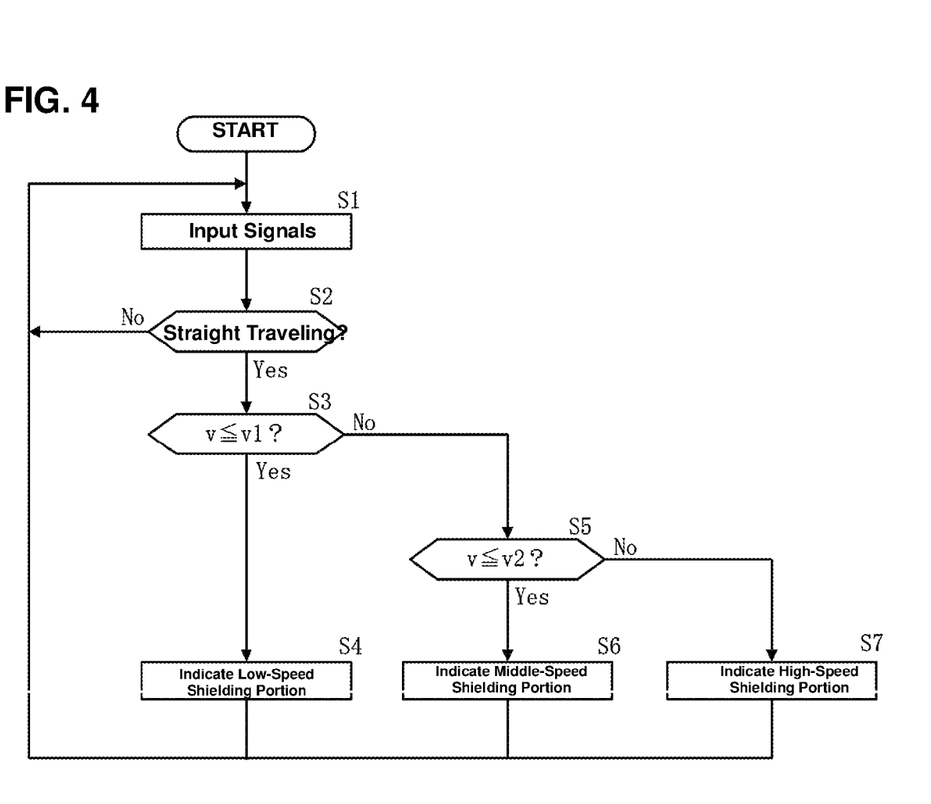
FIG. 4 is a flowchart showing control processing of the view adjustment device.

Next, the control processing of the view adjustment device 3 will be described based on a flowchart of FIG. 4. Herein, reference characters Si (i=1, 2 . . . ) denote steps for respective processing. First, detection signals of the sensors 12-15 and the like are inputted (S1), and then the control proceeds to S2, where it is determined whether the vehicle V is in a straight-traveling state or not. When it is determined in S2 that the vehicle V is in the straight-traveling state, the control proceeds to S3, where it is determined whether the vehicle V travels at the low traveling speed or not. When it is determined in S2 that the vehicle V is not in the straight-traveling state, the control returns to S1.

It is determined in S3 whether or not the vehicle speed v is a specified speed v1, for example 40 km/h, or lower. When it is determined in S3 that the vehicle speed v is the specified speed v1 or lower, the low-speed shielding portion 31 is indicated (S4), and then the control returns (see FIG. 5A). In a case in which the vehicle V travels at the low vehicle speed, the rate of the fusion of the both eyes of the driver is substantially equal (50:50) and the direction of a sensible front which the driver sensibly recognizes as a vehicle-body front substantially matches the direction of the extension line E, so that the driver looks toward the physical front position A. When it is determined in S3 that the vehicle speed v is higher than the specified speed v1, the control proceeds to S5, where it is determined whether the vehicle V travels at the middle traveling speed or not.

It is determined in S5 whether or not the vehicle speed v is a specified speed v2 (v1<v2), for example 80 km/h, or lower. When it is determined in S5 that the vehicle speed v is the specified speed v2 or lower, the middle-speed shielding portion 32 is indicated (S6), and then the control returns (see FIG. 5B). In a case in which the vehicle V travels at the middle vehicle speed, the right-side eye of the driver gets some stress from the right-side front pillar 1 and thereby the amount of visual information recognized by the left-side eye becomes more than that recognized by the right-side eye, so that there is a tendency that the rate of the fusion of the left-side eye of the driver becomes greater than that of the right-side eye. However, since the consciousness of the driver can be turned toward the leftward side by the apex 32p of the middle-speed shielding portion 32, an occurrence of a difference in the rate of the fusion between the both eyes can be suppressed. When it is determined in S5 that the vehicle speed v is higher than the specified speed v2, the control proceeds to S7, where it is determined whether the vehicle V travels at the high traveling speed or not.

Since the vehicle V travels at the high traveling speed higher than the specified speed v2, the high-speed shielding portion 33 is indicated (S7), and then the control returns (see FIG. 5C). In a case in which the vehicle V travels at the high vehicle speed, the amount of visual information recognized by the left-side eye becomes much more than that recognized by the right-side eye, so that there is a tendency that the difference in the rate of the fusion between the both eyes increases. However, since the consciousness of the driver can be turned toward the leftward side by the apex 33p of the high-speed shielding portion 33 which has greater visual stimulation than the middle-speed shielding portion 32, an increase of the difference in the rate of the fusion between the both eyes can be suppressed.

Hereinafter, the operation/effects of the view adjustment device 3 of the vehicle V of the present embodiment will be described. According to the view adjustment device 3 of the vehicle V, since the apex 33p of the high-speed shielding portion 33 indicated at the time of the high vehicle-speed traveling is indicated at the position which is located relatively on the leftward side, compared to the apex 31p of the low-speed shielding portion 31 indicated at the time of the low vehicle-speed traveling or the apex 32p of the middle-speed shielding portion 32 indicated at the time of the middle vehicle-speed traveling, the consciousness of the driver can be turned toward the leftward side. Thereby, by reducing the pressure feeling caused by the right-side front pillar 1 and recovering the predominance of the right-side eye, a decrease of the rate of the fusion of the right-side eye can be suppressed at the time of the high vehicle-speed traveling, so that a gap between the physical front direction of the vehicle body and the vehicle-body front direction which the driver recognizes can be suppressed.

Since the visual-stimulation indicating mechanism 18 is configured to indicate the shielding portions 31-33 at the lower-end portion of the windshield glass 2, the consciousness of the driver can be turned toward the leftward side, ensuring the view of the driver.

Since the visual stimulation is the shielding portions 31-33 which are configured substantially in the triangular shape such that their bases are positioned at the lower end of the windshield glass 2 and their apexes 31p-33p are directed toward a central side of the windshield glass 2, the consciousness of the driver can be turned toward the leftward side, ensuring the view of the driver, with a simple structure.

Since the visual-stimulation indicating mechanism 18 is configured such that the shielding portion 33 becomes larger as the vehicle's traveling speed becomes higher, the decrease of the fusion of the right-side eye can be suppressed even in a case in which the amount of visual information obtained through the windshield glass 2 is large.

Since the visual-stimulation indicating mechanism 18 is configured such that the shielding portion 33 is movable leftward from the physical front position A which corresponds to the direction of the vehicle-body center line, the decrease of the rate of the fusion of the right-side eye can be suppressed with a simple structure.

Since the direction of the vehicle-body center line is the direction of the extension line E which connects the center 4p, in the vehicle width direction, of the driver's seat 4 where the driver is seated and the top 6p of the meter hood 6a provided at the instrument panel 6, the driver can be prevented from having a sense of discomfort at the time of vehicle stop.

Embodiment 2

A view adjustment device according to a second embodiment will be described referring to FIGS. 6A-6C. The same reference characters are applied to the same members as those of the above-described first embodiment. While the visual stimulation of the first embodiment comprises the triangular-shaped shielding portions 31-33 which have the apexes 31p-33p and the bases positioned at the lower end of the windshield glass 2, the visual stimulation of the second embodiment comprises inverted triangular-shaped shielding portions 34-36 which have apexes 34p-36p and bases positioned at an upper end of a windshield glass 2A.

Figure 6A:
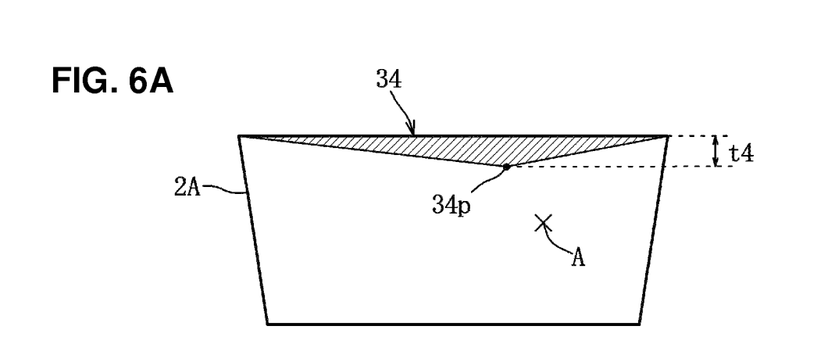
FIGS. 6A, 6B and 6C are indication examples of visual stimulation according to a second embodiment, FIG. 6A being the one at the time of the low vehicle-speed traveling, FIG. 6B being the one at the time of the middle vehicle-speed traveling, and FIG. 6C being the one at the time of the high vehicle-speed traveling.

As shown in FIG. 6A, the low-speed shielding portion 34 is indicated by an indication control portion (not illustrated) at the time of the low traveling-speed traveling. The apex 34p of the low-speed shielding portion 34 is set at the same position, in the vehicle width direction, as the physical front position A which corresponds to the direction of the extension line E, and set at a level which is t4 spaced apart from the upper end of the windshield glass 2A.

Figure 6B:
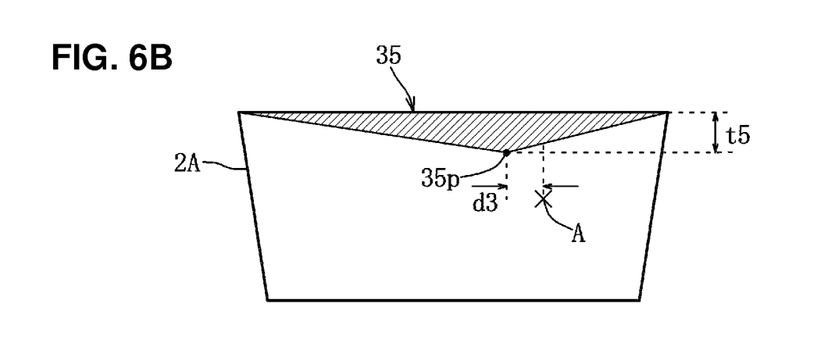

As shown in FIG. 6B, the middle-speed shielding portion 35 is indicated by the indication control portion at the time of the middle traveling-speed traveling. The apex 35p of the middle-speed shielding portion 35 is set at a position which is d3 spaced leftward from the physical front position A, and set at a level which is t5 (t4<t5) spaced apart from the upper end of the windshield glass 2A.

Figure 6C:
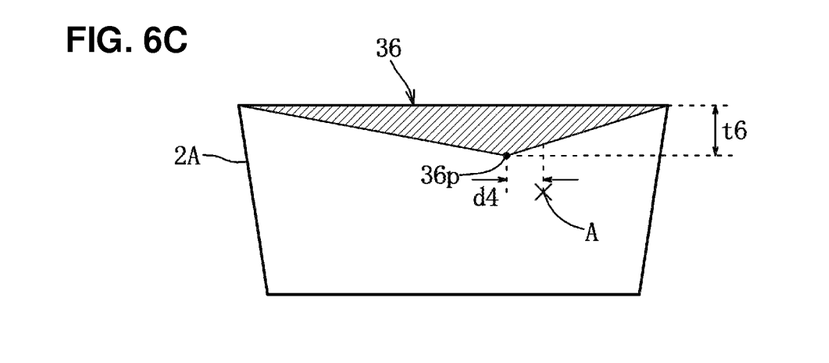

As shown in FIG. 6C, the high-speed shielding portion 36 is indicated by the indication control portion at the time of the high traveling-speed traveling. The apex 36p of the high-speed shielding portion 36 is set at a position which is d4 (d3<d4) spaced leftward from the physical front position A, and set at a level which is t6 (t5<t6) spaced apart from the upper end of the windshield glass 2. According to the view adjustment device of the second embodiment, since the shielding portions 34-36 are indicated at the upper end portion of the windshield glass 2A, the consciousness of the driver can be turned toward the leftward side, ensuring the view of the driver.

Next, modifications of the above-described embodiments will be described.

1) While the above-described embodiments describe the example of the right-handle vehicle in which the steering wheel is arranged on the right, the present invention is applicable to a left-handle vehicle in which the steering wheel is arranged on the left, which can provide the similar effects as well. In this case, the apex of the shielding portion indicated at the high vehicle-speed traveling is configured to be indicated at a position which is located relatively on a rightward side, compared to the apex of the shielding portion indicated at the time of the low vehicle-speed traveling.

2) While the above-described embodiments describe the example in which the shielding portions for the low, middle, and high vehicle speed sections are formed for the purpose of structural simplification, a shielding portion which is configured to lineally shift to the inward side in the vehicle width direction according to the vehicle traveling speed is applicable. In this case, it is preferable that the position of the apex be also configured to shift to the central portion of the windshield glass according to the above-described inward shift.

Figure 7A:
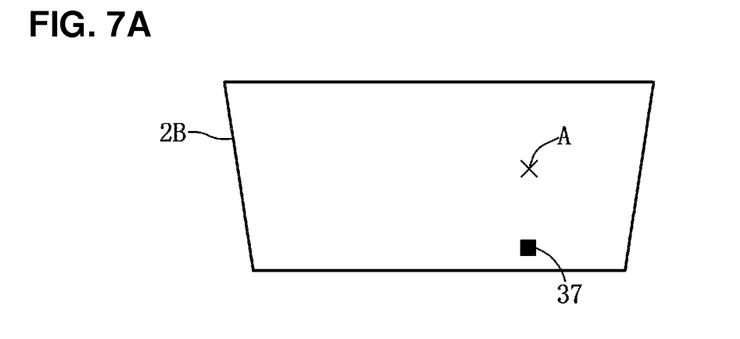
FIGS. 7A, 7B and 7C are indication examples of visual stimulation according to a modification, FIG. 7A being the one at the time of the low vehicle-speed traveling, FIG. 7B being the one at the time of the middle vehicle-speed traveling, and FIG. 7C being the one at the time of the high vehicle-speed traveling.
Figure 7B:
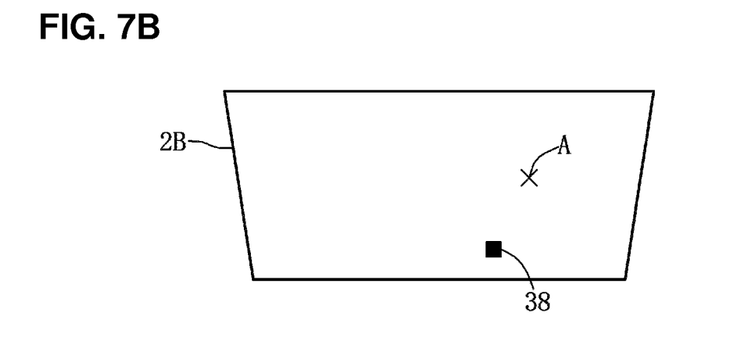
Figure 7C:
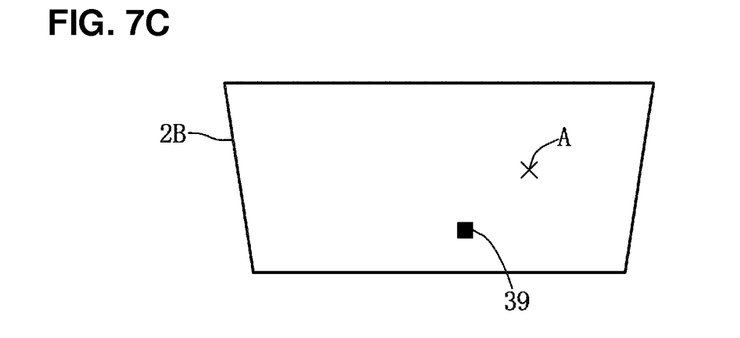

3) While the above-described embodiments describe the example of the triangular-shaped shielding portion having the base positioned at the upper end or the lower end of the windshield glass, a triangular-shaped shielding portion in which the base is positioned at a portion of the upper end or the lower end of the windshield glass is applicable, and also a bar-shaped shielding portion is applicable. Further, a small-sized shielding portion (icon) to attract the consciousness of the driver to a surface of the windshield glass may be indicated by using a head-up display. In this case, a low-speed icon 37 is indicated at a position which is located below the physical front position A corresponding to the direction of the extension line at the time of the low traveling-speed and straight traveling as shown in FIG. 7A. Also, a middle-speed icon 38 is indicated at a position which is located relatively on the inward side, in the vehicle width direction, compared to the low-speed icon 37, and on the central side of a windshield glass 2B at the time of the middle traveling-speed and straight traveling (see FIG. 7B), and a high-speed icon 39 is indicated at a position which is located relatively on the inward side, in the vehicle width direction, compared to the middle-speed icon 38, and on the central side of the windshield glass 2B at the time of the high traveling-speed and straight traveling (see FIG. 7C).

4) While the above-described embodiments describe the example of the shielding portion having the transmittance of 0%, the magnitude of the transmittance is not limited to 0% as long as the transmittance provides a translucent or non-transparent state of the windshield glass in which driver's forward visibility through the windshield glass is limited so that the driver can recognize a road-surface condition through the windshield glass and also the driver's consciousness can be attracted. Further, the visual stimulation may be configured to become greater by gradually decreasing the transmittance according to an increase of the traveling speed of the vehicle.

5) The present invention should not be limited to the above-described embodiments or examples, and any other modifications or improvements may be applied within the scope of a spirit of the present invention.

What is claimed is:

1. A view adjustment device of a vehicle which adjusts a view recognized by a driver through a windshield glass, comprising:
   a visual-stimulation indicator capable of indicating visual stimulation in a view area of the diver; and
   a controller to control an indication manner of the visual-stimulation indicator,
   wherein said controller includes a traveling-direction determination portion configured to determine a traveling direction of the vehicle, a traveling-speed determination portion configured to determine a traveling speed of the vehicle, and an indication control portion to control said visual-stimulation indicator based on determination results of said traveling-direction determination portion and said traveling-speed determination portion, and
   said indication control portion is configured such that when said traveling-direction determination portion determines that the vehicle travels in a straight direction, the visual stimulation indicated by said visual-stimulation indicator in a case in which the vehicle's traveling speed is high is indicated at a position which is located on an inward side, in a vehicle width direction, compared to the visual stimulation indicated by the visual-stimulation indicator in a case in which the vehicle's traveling speed is low.

2. The view adjustment device of the vehicle of claim 1, wherein said visual-stimulation indicator is configured to indicate the visual stimulation at an upper-end portion or a lower-end portion of the windshield glass.

3. The view adjustment device of the vehicle of claim 2, wherein the visual stimulation indicted by said visual-stimulation indicator is a shielding portion which has a translucent or non-transparent state of the windshield glass in which driver's forward visibility through the windshield glass is limited, the shielding portion being configured substantially in a triangular shape such that a base thereof is positioned at an upper end or a lower end and an apex thereof is directed toward a central side of the windshield glass.

4. The view adjustment device of the vehicle of claim 1, wherein said visual-stimulation indicator is configured such that the visual stimulation indicated thereby becomes larger as the vehicle's traveling speed becomes higher.

5. The view adjustment device of the vehicle of claim 1, wherein said visual-stimulation indicator is configured such that the visual stimulation indicated thereby is movable from a point which corresponds to a physical front direction of a vehicle body toward the inward side, in the vehicle width direction, of the windshield glass.

6. The view adjustment device of the vehicle of claim 5, wherein said physical front direction of the vehicle body is a direction of an extension line which connects a center, in the vehicle width direction, of a driver's seat and a top of a meter hood provided at an instrument panel.

* * * * *